(12) United States Patent
Su et al.

(10) Patent No.: US 10,021,411 B2
(45) Date of Patent: Jul. 10, 2018

(54) TECHNIQUES IN BACKWARDS COMPATIBLE MULTI-LAYER COMPRESSION OF HDR VIDEO

(71) Applicant: Apple Inc., Cupertino, CA (US)

(72) Inventors: Yeping Su, Sunnyvale, CA (US); Chris Y. Chung, Sunnyvale, CA (US); Hsi-Jung Wu, San Jose, CA (US); Jiefu Zhai, San Jose, CA (US); Ke Zhang, San Jose, CA (US); Xiaosong Zhou, Campbell, CA (US)

(73) Assignee: APPLE INC., Cupertino, CA (US)

( * ) Notice: Subject to any disclaimer, the term of this patent is extended or adjusted under 35 U.S.C. 154(b) by 185 days.

(21) Appl. No.: 14/704,707

(22) Filed: May 5, 2015

(65) Prior Publication Data

US 2016/0127738 A1 May 5, 2016

Related U.S. Application Data

(60) Provisional application No. 62/075,563, filed on Nov. 5, 2014.

(51) Int. Cl.
*H04N 7/12* (2006.01)
*H04N 19/503* (2014.01)
*H04N 19/124* (2014.01)
*H04N 19/172* (2014.01)
*H04N 19/147* (2014.01)
*H04N 19/30* (2014.01)

(52) U.S. Cl.
CPC ......... *H04N 19/503* (2014.11); *H04N 19/124* (2014.11); *H04N 19/147* (2014.11); *H04N 19/172* (2014.11); *H04N 19/30* (2014.11)

(58) Field of Classification Search
CPC .................................................. H04N 19/503
USPC .................................................. 375/240.12
See application file for complete search history.

(56) References Cited

U.S. PATENT DOCUMENTS

2008/0199088 A1* 8/2008 Chen ..................... H04N 19/61
382/232
2013/0329778 A1 12/2013 Su et al.
(Continued)

FOREIGN PATENT DOCUMENTS

WO WO 2012/122421 A1 9/2012
WO WO 2013/103522 A1 7/2013

OTHER PUBLICATIONS

International Patent Application No. PCT/US2015/058098; Int'l Preliminary Report on Patentability; dated May 18, 2017; 7 pages.

*Primary Examiner* — Richard Torrente
(74) *Attorney, Agent, or Firm* — Baker & Hostetler LLP

(57) ABSTRACT

A scalable coding system codes video as a base layer representation and an enhancement layer representation. A base layer coder may code an LDR representation of a source video. A predictor may predict an HDR representation of the source video from the coded base layer data. A comparator may generate prediction residuals which represent a difference between an HDR representation of the source video and the predicted HDR representation of the source video. A quantizer may quantize the residuals down to an LDR representation. An enhancement layer coder may code the LDR residuals. In other scalable coding systems, the enhancement layer coder may code LDR-converted HDR video directly.

22 Claims, 4 Drawing Sheets

(56) References Cited

U.S. PATENT DOCUMENTS

| | | |
|---|---|---|
| 2014/0003527 A1 | 1/2014 | Tourapis |
| 2014/0185664 A1 | 7/2014 | Van Der Auwera et al. |
| 2014/0241418 A1 | 8/2014 | Garbas et al. |
| 2014/0254681 A1* | 9/2014 | Aminlou ............... H04N 19/105 375/240.16 |
| 2014/0341305 A1* | 11/2014 | Qu ........................ H04N 19/70 375/240.26 |
| 2015/0043633 A1* | 2/2015 | Regunathan ......... H04N 19/197 375/240.03 |

* cited by examiner

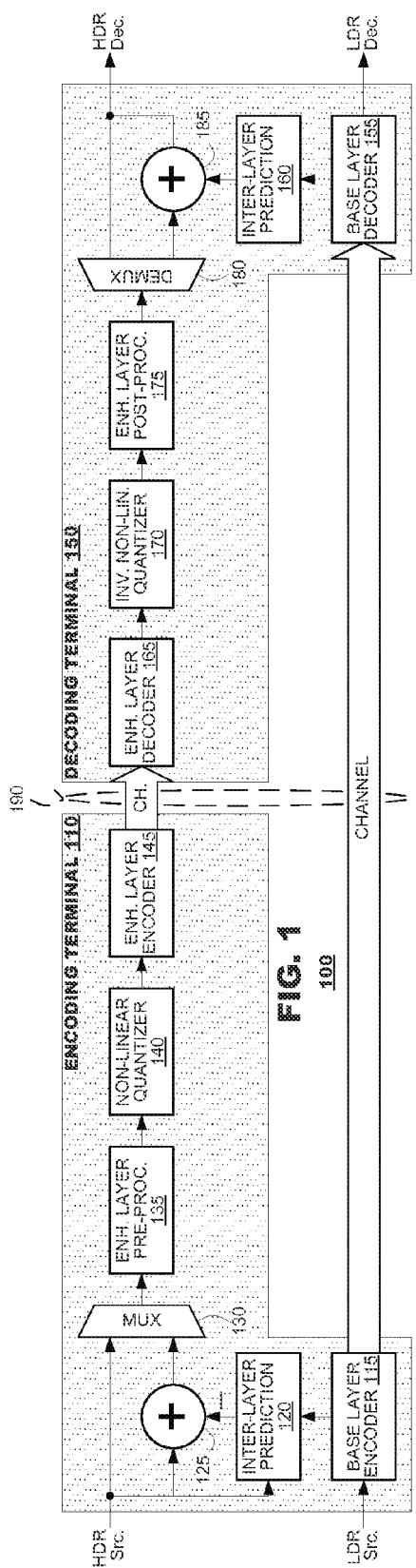
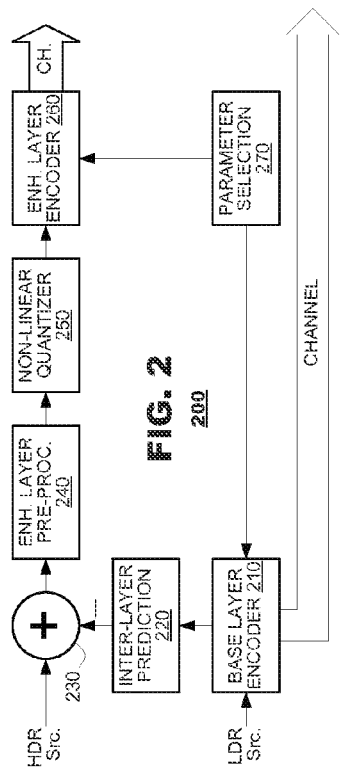

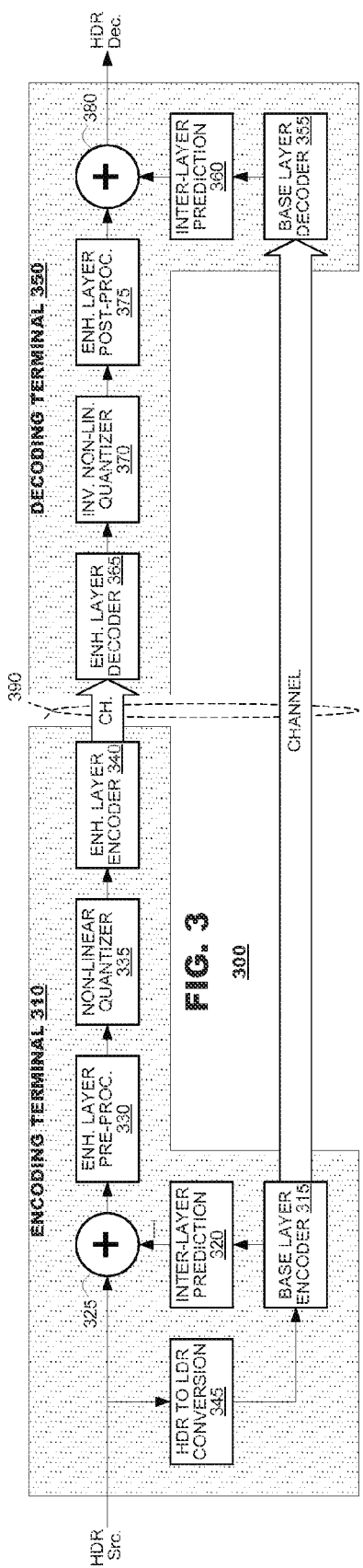
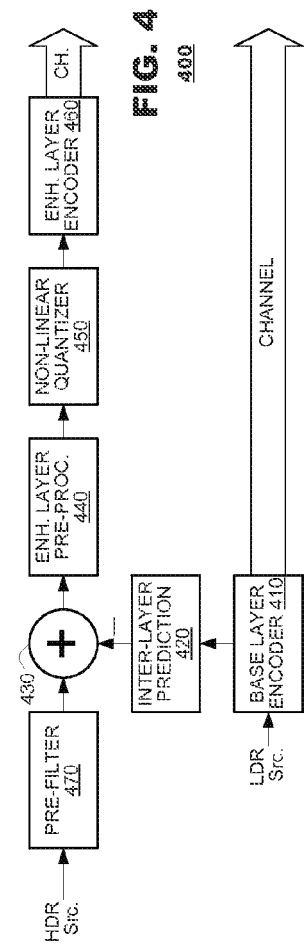

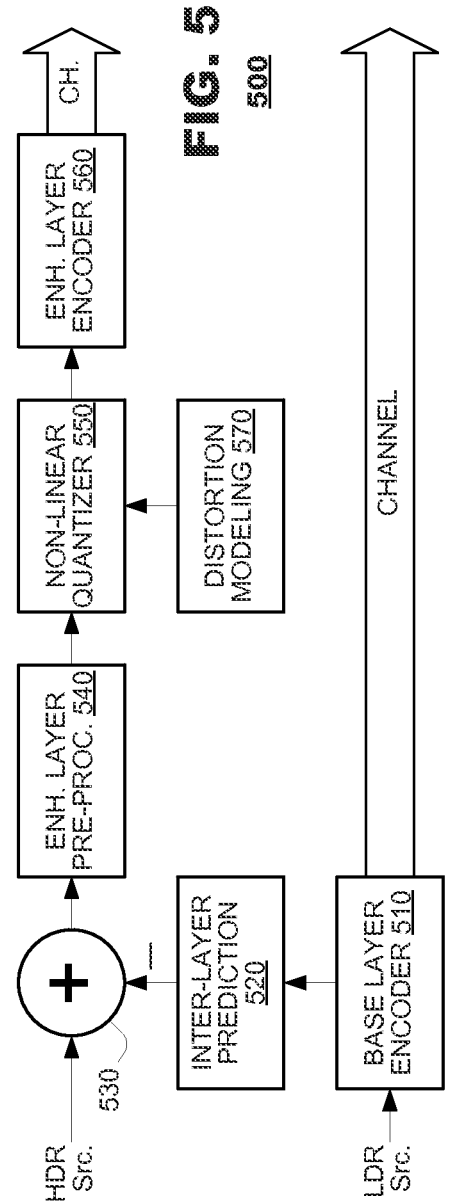

600

TECHNIQUES IN BACKWARDS COMPATIBLE MULTI-LAYER COMPRESSION OF HDR VIDEO

REFERENCE TO RELATED APPLICATION

The present application benefits from priority afforded by U.S. Provisional Application No. 62/075,563, filed Nov. 5, 2014, the disclosure of which is incorporated herein by reference.

BACKGROUND

The present disclosure relates to video coding systems and, in particular, systems that code high dynamic range ("HDR") video content.

Modern video delivery and display systems vary in the dynamic range of the video signal that they can support. Where image data values may have been defined using 8- or 10-bit depth color values, newer image processing applications are generating such image data values at 12- or perhaps 16-bit values. The increasing dynamic range permits image content to be rendered at finer quantization levels than before by representing a greater range of luminance and color information than low dynamic range ("LDR") representations. Thus, support of HDR image content can support video delivery and display at higher image quality.

There are very few deployed coding systems that are capable of coding and decoding HDR content. There are a wide variety of coding/decoding systems, however, that support LDR content. Accordingly, the inventors perceive a need for an LDR-based coding system that can support HDR content.

BRIEF DESCRIPTION OF THE DRAWINGS

FIG. 1 is a block diagram of a coder/decoder system according to an embodiment of the present disclosure.

FIG. 2 illustrates an encoding terminal according to an embodiment of the present disclosure.

FIG. 3 illustrates a system according to a further embodiment of the present disclosure.

FIG. 4 illustrates an encoding terminal according to another embodiment of the present disclosure.

FIG. 5 illustrates an encoding terminal according to a further embodiment of the present disclosure.

DETAILED DESCRIPTION

Figure 6:
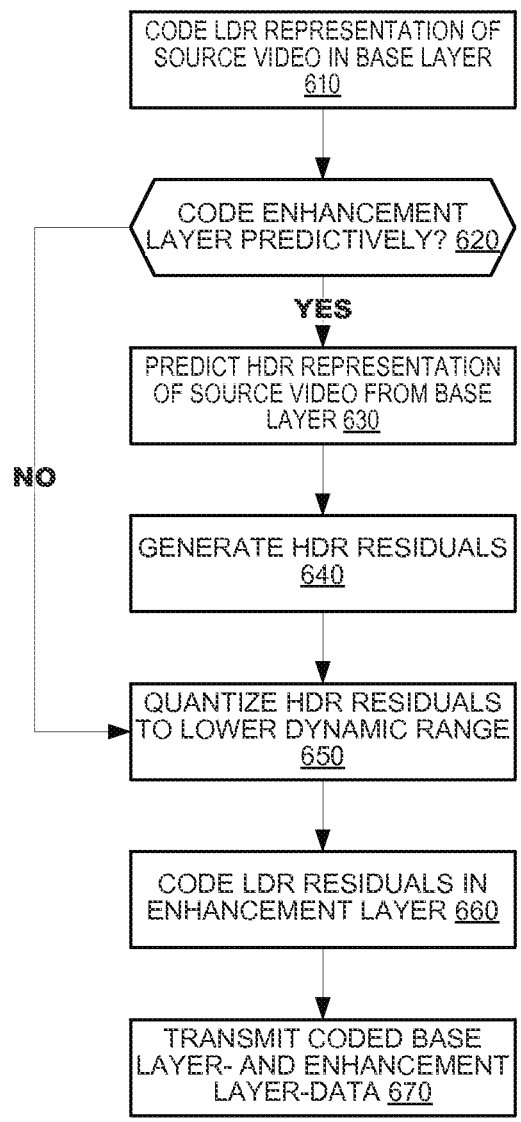
FIG. 6 illustrates a method according to an embodiment of the present disclosure.

Embodiments of the present disclosure provide techniques for coding HDR content using LDR coders. A system may code the video as a base layer representation and as an enhancement layer representation. A base layer coder may code an LDR representation of a source video. A predictor may predict an HDR representation of the source video from the coded base layer data. A comparator may generate prediction residuals representing a difference between an HDR representation of the source video and the predicted HDR representation of the source video. A quantizer may quantize the residuals down to an LDR representation. An enhancement layer coder may code the LDR residuals. In other embodiments, the enhancement layer coder may code LDR-converted HDR video directly, without prediction.

There are several benefits of such a system. Since only low bit-depth codecs are used, it is easier to deploy the system on devices without high bit-depth decoders. The base layer bit stream can be made backward-compatible for LDR-only devices.

FIG. 1 illustrates a system 100 according to an embodiment of the present disclosure. The system 100 may include an encoding terminal 110 and a decoding terminal 150 coupled by a communication channel 190. The encoding terminal 110 may include a base layer encoder 115, an inter-layer predictor 120, a subtractor 125, a switch controller 130, an enhancement layer pre-processor 135, a non-linear quantizer 140, and an enhancement layer encoder 145. The decoding terminal 150 may include a base layer decoder 155, an inter-layer predictor 160, an enhancement layer decoder 165, an inverse non-linear quantizer 170, an enhancement layer post-processor 175, a switch controller 180, and an adder 185.

In the embodiment of FIG. 1, the encoding terminal 110 may code two instances of source video—a high dynamic range instance and a lower dynamic range instance. Typically, the LDR instance represents video at a smaller bit depth, with color component data represented with 8- or 10-bit values, than the HDR instance, which may represent image data at higher bit depths (say, 10- or 12-bit values). In some embodiments, the LDR video may be authored for rendering on display devices that have lower dynamic range than the HDR video. Accordingly, the LDR and HDR instances each may have been tuned for different types of display equipment and, therefore, they may have image data that is tailored for differences among such equipment.

The base layer encoder 115 may code the LDR source video to achieve bitrate compression. For example, the base layer encoder 115 may perform motion compensated prediction that exploits spatial and/or temporal redundancies in the LDR source video to develop a compressed representation of the LDR source video. The base layer encoder 115 may output compressed base layer video to the channel 190. In an embodiment, the base layer encoder 115 may operate according to a predetermined coding protocol, such as those defined in ITU H.263, H.264, H.265 and the like.

The base layer encoder 115 also may decode the compressed LDR video (not shown) for local use in developing prediction references for coding later-received LDR source video as part of temporal prediction. The base layer encoder 115 also may decode compressed LDR video for local use in inter-layer prediction.

An inter-layer predictor 120 may generate predicted data for developing prediction references for the HDR source video. That is, the inter-layer predictor 120 may generate an HDR representation of decoded LDR video that is available from the base layer encoder 115 and output the HDR representation to the subtractor 125. The inter-layer predictor 120 may generate an up-converted representation of the decoded LDR video at the bit depth of the HDR data signal. Additionally, if the HDR source video includes color shifts or intensity mapping as compared to the LDR video to account for differences in HDR and LDR display environments, the inter-layer predictor 120 may apply effects to the decoded LDR video to conform the LDR video to the HDR video.

The subtractor 125 may perform a pixel-by-pixel comparison between frames of the HDR source video and the predicted video output by the inter-layer predictor 120. The subtractor 125 may output pixel residual signals representing a difference between the HDR source video and the predicted video output by the inter-layer predictor 120.

The switch controller 130 may select either the pixel residuals or the HDR source video for input to the enhancement layer encoder 145. The switch controller 130 may perform its selection in response to estimates that are performed by a controller (not shown) of the encoding terminal 110 that estimates relative efficiencies and resultant coding quality that will be achieved by coding of a prediction-based signal or by coding of the HDR source video directly. The switching decisions may be performed adaptively on different portions of the input video, such as different sequences, scenes, frames, or blocks within frames. Switching flags may be developed in response to these decisions, which may be transmitted to the decoding terminal 150 as part of a metadata stream contained within coded enhancement layer data.

The enhancement layer pre-processor 135 may apply pre-processing operations to conform the HDR signal to later stages of encoding. Typically, the enhancement layer pre-processor 135 may perform scaling and signal shaping to reduce resolution as well as complexity prior to coding by the enhancement layer encoder 145.

The non-linear quantizer 140 may quantize input video prior to coding. The non-linear quantizer 140 may quantize input video to reduce its bit depth to a level that is appropriate for coding by the enhancement layer encoder 145. In one example, the enhancement layer encoder 145 may be based on an LDR coder that codes input video data having a bit depth of 8 bits; in such an embodiment, the non-linear quantizer 140 may quantize its input data down to a bit depth of 8 bits. The non-linear quantizer 140 may apply different quantization levels to different portions of the video sequence, which may vary over different sequences, scenes, frames, or blocks within frames. Changes in quantization may be reported to a decoding terminal 150 as metadata in the coded video data.

The enhancement layer encoder 145 may code the quantized video to achieve bitrate compression. For example, the enhancement layer encoder 145 may perform motion compensated prediction that exploits spatial and/or temporal redundancies in the quantized video to develop a compressed representation of the quantized video. The enhancement layer encoder 145 may output a compressed enhancement layer video to the channel 190. In an embodiment, the enhancement layer encoder 145 may operate according to a predetermined coding protocol, such as those defined in ITU H.263, H.264, H.265 and the like.

In an embodiment, the enhancement layer encoder 145 may refer to the switch controller 130 switching flag as it makes coding decisions for the video data input to it. For example, the enhancement layer encoder 145 may disable prediction (both intra- and inter-prediction) for spatial regions of a frame that represent a boundary between areas where inter-layer prediction residuals are present and areas where HDR video is present. Such techniques likely will make the enhancement layer encoder 145 faster, as well as reduce unpleasant visual artifacts in decoded video.

Similarly, the non-linear quantizer 140 may use the flag in its operations. For example, the non-linear quantizer 140 may use relatively larger quantization step size when the flag indicates the input data is taken directly from the HDR source data (e.g., non-residual data) than when the flag indicates the input data is represented by prediction residuals.

The arrangement of elements of an encoding terminal 110 may be altered from the example illustrated in FIG. 1. For example, the non-linear quantizer 140 may be provided upstream of the enhancement layer processor 135, if desired. Additionally, if desired, enhancement layer processor 135 may be provided upstream of the switch controller 130, in which case the enhancement layer processor 135 may be replicated and placed in the HDR source path and the pixel residual path. In such an embodiment, operation of the enhancement layer processor 135 may be tailored for each type of data.

Although FIG. 1 illustrates the base layer encoder 115 and enhancement layer encoder 145 as separate functional blocks, these units may be implemented as a common hardware-based encoder when implemented in an encoding terminal 110. As compared to a software-based encoder, hardware-based encoders typically operate with high throughput and reduced computational resources. The hardware-based encoder may be operated on a time shared basis, operating on LDR source video during some periods of operation and operating on quantized HDR video during other periods of operation.

The coded video data may be distributed to a variety of decoding terminals 150. Some decoding terminals (not shown) may be associated with LDR displays; they need only receive the coded base layer data to generate decoded LDR video for rendering. Other decoding terminals 150, such as the terminal illustrated in FIG. 1, may be associated with HDR displays and may receive both the coded base layer data and the coded enhancement layer data for decoding.

FIG. 1 also illustrates a decoding terminal 150 for decoding of HDR data. The base layer decoder 155 may decode coded base layer video to obtain a decoded video signal therefrom. The base layer decoder 155 may invert coding operations applied by the base layer encoder 115 of the encoding terminal 110. The base layer decoder 155 may output decoded LDR video therefrom.

An inter-layer predictor 160 may generate predicted data for developing prediction references for the HDR source video. That is, the inter-layer predictor 160 may generate an HDR representation of decoded LDR video that is available from the base layer decoder 155 and output the HDR representation to the adder 185. The inter-layer prediction may generate an up-converted representation of the decoded LDR video at the bit depth of the HDR data signal. Additionally, if the HDR source video includes color shifts or intensity mapping as compared to the LDR video to account for differences in HDR and LDR display environments, the inter-layer predictor 160 may apply effects to the decoded LDR video to conform the LDR video to the HDR video.

The enhancement layer decoder 165 may decode coded enhancement layer video to obtain a decoded video signal therefrom. The enhancement layer decoder 165 may invert coding operations applied by the enhancement layer encoder 145 of the encoding terminal 110. The enhancement layer decoder 165 may output recovered video therefrom.

The inverse non-linear quantizer 170 may scale video output by the enhancement layer decoder 165. The inverse non-linear quantizer 170 may scale the video to return its bit depth to the level of the HDR source video. Thus, if the non-linear quantizer 140 had quantized input data from a 10-bit bit depth to an 8-bit bit depth, the inverse non-linear quantizer 170 may scale the video back to the 10-bit bit depth. It is not required, however, that the bit depth of the output HDR video match the bit depth of the HDR source video. Instead, the inverse quantizer may scale the video to the bit depth of a display with which the decoding terminal 150 is associated. For example, if the decoding terminal were associated with a display device that output HDR video having a 10-bit bit depth, the inverse non-linear quantizer 170 may scale the video to 10-bit values even if the encoding terminal operated on HDR source video at a 12-bit bit depth.

The inverse non-linear quantizer 170 may apply different quantization levels to different portions of the video sequence, which may vary over different sequences, scenes, frames, or blocks within frames, as identified in metadata present in the coded video data.

The switch controller 180 may output video either directly from the decoding terminal 150 or to the enhancement layer post-processor 175 as determined by switching flags that are contained in the coded video. As indicated, the switching flags may have been assigned dynamically by an encoding terminal 110 by various factors during operation. Thus, the switch controller 180 may output different portions of the video to different outputs for different sequences, scenes, frames, or blocks within frames.

The enhancement layer post-processor 175 may apply post-processing operations to improve image quality of the HDR video output from the inverse non-linear quantizer 170. Such post-processing operations may include, for example, deblocking filtering.

The adder 185 may add pixel residuals output from the enhancement layer post-processor 175 to predicted pixel content provided by the inter-layer predictor 160. The adder 185 may output reconstructed frame data from the decoding terminal 150.

As with the encoding terminal 110, the arrangement of elements of a decoding terminal 150 may be altered from the example illustrated in FIG. 1. For example, the inverse non-linear quantizer 170 may be provided downstream of the enhancement layer post-processor 175, if desired. Additionally, if desired, enhancement layer post-processor 175 may be provided downstream of the switch controller 180, in which case the enhancement layer post-processor 175 may be replicated and placed in both the HDR source path and the pixel residual path. In such an embodiment, operation of the enhancement layer processor 175 may be tailored for each type of data.

Accordingly, an encoding terminal 110 may generate a coded representation of HDR video that includes coded base layer data representing an LDR coding of LDR source video and coded enhancement layer data representing an LDR coding of down-converted HDR video (either the HDR source video or residuals from an inter-layer prediction). The coded enhancement layer data may include metadata representing coding decisions made by the inter-layer predictor 120, switch controller 130, enhancement layer pre-processor 135 and non-linear quantizer 140. The metadata from these units may be consumed by their counterparts in the decoding terminal 150 to invert their coding operations.

FIG. 2 illustrates an encoding terminal 200 according to an embodiment of the present disclosure. The encoding terminal 200 may code two instances of source video—a high dynamic range instance and a lower dynamic range instance. Again, the LDR instance may provide a representation of a source video at a lower dynamic range than the HDR instance. Typically, the LDR instance represents video at a smaller bit depth, with color component data represented with 8- or 10-bit value, than the HDR instance, which may represent image data at higher bit depths (say, 10- or 12 bit values). In some embodiments, the LDR video may be authored for rendering on display devices that have lower dynamic range than the HDR video. Accordingly, the LDR and HDR instances each may have been tuned for different types of display equipment and, therefore, they may have image content that is tailored for differences among such equipment.

The encoding terminal 200 may include a base layer encoder 210, an inter-layer predictor 220, a subtractor 230, an enhancement layer pre-processor 240, a non-linear quantizer 250, an enhancement layer encoder 260, and parameter selector 270.

The base layer encoder 210 may code an LDR source video to achieve bitrate compression. For example, the base layer encoder 210 may perform motion compensated prediction that exploits spatial and/or temporal redundancies in the LDR source video to develop a compressed representation of the LDR source video. The base layer encoder 210 may output compressed base layer video to the channel. In an embodiment, the base layer encoder 210 may operate according to a predetermined coding protocol, such as those defined in ITU H.263, H.264, H.265 and the like.

The base layer encoder 210 also may decode the compressed LDR video (not shown) for local use in developing prediction references for coding later-received LDR source video as part of temporal prediction. The base layer encoder 210 also may decode compressed LDR video for local use in inter-layer prediction.

An inter-layer predictor 220 may generate predicted data for developing prediction references for the HDR source video. That is, the inter-layer predictor 220 may generate an HDR representation of decoded LDR video that is available from the base layer encoder 210 and output the HDR representation to the subtractor 230. The inter-layer prediction may generate an up-converted representation of the decoded LDR video at the bit depth of the HDR data signal. Additionally, if the HDR source video includes color shifts or intensity mapping as compared to the LDR video to account for differences in HDR and LDR display environments, the inter-layer predictor 220 may apply effects to the decoded LDR video to conform the LDR video to the HDR video.

The subtractor 230 may perform a pixel-by-pixel comparison between frames of the HDR source video and the predicted video output by the inter-layer predictor 220. The subtractor 230 may output pixel residual signals representing a difference between the HDR source video and the predicted video output by the inter-layer predictor 220.

The enhancement layer pre-processor 240 may apply preprocessing operations to conform the HDR pixel residuals to later stages of encoding. Typically, the enhancement layer coder may apply spatial filtering to smooth image content prior to coding.

The non-linear quantizer 250 may quantize input video prior to coding. The non-linear quantizer 250 may quantize the video to reduce its bit depth to a level that is appropriate for coding by the enhancement layer encoder 260. In one example, the enhancement layer encoder 260 may be based on an LDR coder that codes input video data having a bit depth of 8 bits; in such an embodiment, the non-linear quantizer 250 may quantize its input data down to a bit depth of 8 bits. The non-linear quantizer 250 may apply different quantization levels to different portions of the video sequence, which may vary over different sequences, scenes, frames, or blocks within frames. Changes in quantization may be reported to a decoding terminal (not shown) as metadata in the coded video data.

The enhancement layer encoder 260 may code the quantized video to achieve bitrate compression. For example, the enhancement layer encoder 260 may perform motion compensated prediction that exploits spatial and/or temporal redundancies in the quantized video to develop a compressed representation of the quantized video. The enhancement layer encoder 260 may output a compressed enhancement layer video to the channel. In an embodiment, the enhancement layer encoder 260 may operate according to a predetermined coding protocol, such as those defined in ITU H.263, H.264, H.265 and the like.

Although FIG. 2 illustrates the base layer encoder 210 and enhancement layer encoder 260 as separate functional blocks, these units may be implemented as a common hardware based encoder when implemented in an encoding terminal 200. As compared to a software-based encoder, hardware-based encoders typically operate with high throughput and reduced computational resources. The hardware-based encoder may be operated on a time shared basis, operating on LDR source video during some periods of operation and operating on quantized HDR video during other periods of operation.

The parameter selector 270 may jointly optimize coding decisions made by the base layer encoder 210 and the enhancement layer encoder. For example, the parameter selector 270 may consider one or more of the following coding decisions jointly:

Rate allocation: The parameter selector 270 may apply bitrate budgets among portions of the source video sequence jointly to collocated portions of the LDR and HDR video. Joint rate allocation may be more streaming friendly, and could be used to satisfy constraints on entropy coding throughput.

Frame type/coding order/GOP structure/temporal prediction decision: The parameter selector 270 may apply common coding decisions (such as coding mode, quantization step size and selection of prediction references) to common portions of the LDR and HDR video. When bit streams from the different layers have the same temporal coding order of frames or the same GOP structure, they can be packaged together easily without extra coding delay. Having bit streams from different layers sharing the same frame types also can be beneficial in terms of coding efficiency. For example, coding errors in the base layer may be propagated to the enhancement layers and, therefore, application of similar temporal predictions in the coding of enhancement layers can contribute to improved coding quality. As another example, the quantization step size for a given area may be determined by the pixel values in the corresponding base-layer area; if a base layer coder codes a dark area of image content, an enhancement layer coder may quantize the corresponding enhancement layer video data with finer quantization.

Block mode decision and motion estimation: certain computations can be shared across layers such as mode decision and motion estimation to reduce complexity.

FIG. 3 illustrates a system 300 according to another embodiment of the present disclosure. The system 300 may include an encoding terminal 310 and a decoding terminal 350 coupled by a communication channel 390. The embodiment of FIG. 3 finds application in coding scenarios where the base layer bit stream need not be compatible with other LDR displays. The encoding terminal 310 may code a single instance of source video—HDR source video—in both the base layer and the enhancement layer. In this application, the encoding terminal 310 may code a most significant bit representation of an HDR source video in the base layer encoder 315. The enhancement layer encoder 340 may code pixel residuals that are generated by inter-layer predictor 320.

The encoding terminal 310 may include a base layer encoder 315, an inter-layer predictor 320, a subtractor 325, an enhancement layer pre-processor 330, a non-linear quantizer 335, an enhancement layer encoder 340, and an HDR-to-LDR converter 345.

The HDR-to-LDR converter 345 may convert the HDR source video from an HDR representation to an LDR representation. Because the base layer encoder 315 does not operate on a separate LDR source video, the HDR-to-LDR converter 345 need not change properties of the HDR source video (such as color gamut). For instance, the base layer bit stream simply may be the HDR source video shifted down to a predetermined bit depth, such as 8-bits.

The base layer encoder 315 may code the down-converted representation of the HDR source video to achieve bitrate compression. For example, the base layer encoder 315 may perform motion compensated prediction that exploits spatial and/or temporal redundancies in the down-converted source video to develop a compressed representation of the down-converted video. The base layer encoder 315 may output compressed base layer video to the channel 390. In an embodiment, the base layer encoder 315 may operate according to a predetermined coding protocol, such as those defined in ITU H.263, H.264, H.265 and the like.

The base layer encoder 315 also may decode the compressed video (not shown) for local use in developing prediction references for coding later-received video as part of temporal prediction. The base layer encoder 315 also may decode compressed video for local use in inter-layer prediction.

An inter-layer predictor 320 may generate predicted data for developing prediction references for the HDR source video. That is, the inter-layer predictor 320 may generate an HDR representation of decoded video that is available from the base layer encoder 315 and output the HDR representation to the subtractor 325. In this case, the inter-layer predictor 320 may be achieved simply by shifting predicted video up to the HDR domain.

The subtractor 325 may perform a pixel-by-pixel comparison between frames of the HDR source video and the predicted video output by the inter-layer predictor 320. The subtractor 325 may output pixel residual signals representing a difference between the HDR source video and the predicted video output by the inter-layer predictor 320.

The enhancement layer pre-processor 330 may apply pre-processing operations to conform the HDR pixel residuals to later stages of encoding. Typically, the enhancement layer pre-processor 330 may perform scaling and signal shaping to reduce resolution as well as complexity prior to coding by the enhancement layer encoder 340.

The non-linear quantizer 335 may quantize input video prior to coding. The non-linear quantizer 335 may quantize the video to reduce its bit depth to a level that is appropriate for coding by the enhancement layer encoder 340. In one example, the enhancement layer encoder 340 may be based on an base layer encoder that codes input video data having a bit depth of 8 bits; in such an embodiment, the non-linear quantizer 335 may quantize its input data down to a bit depth of 8 bits. The non-linear quantizer 335 may apply different quantization levels to different portions of the video sequence, which may vary over different sequences, scenes, frames, or blocks within frames. Changes in quantization may be reported to a decoding terminal 350 as metadata in the coded video data.

The enhancement layer encoder 340 may code the quantized video to achieve bitrate compression. For example, the enhancement layer encoder 340 may perform motion compensated prediction that exploits spatial and/or temporal redundancies in the quantized video to develop a compressed representation of the quantized video. The enhancement layer encoder 340 may output a compressed enhancement layer video to the channel 390. In an embodiment, the enhancement layer encoder 340 may operate according to a predetermined coding protocol, such as those defined in ITU H.263, H.264, H.265 and the like.

Although FIG. 3 illustrates the base layer encoder 315 and enhancement layer encoder 340 as separate functional blocks, these units may be implemented as a common hardware-based encoder when implemented in an encoding terminal 310. As compared to a software-based encoder, hardware-based encoders typically operate with high throughput and reduced computational resources. The hardware-based encoder may be operated on a time shared basis, operating on LDR source video during some periods of operation and operating on quantized HDR video during other periods of operation.

FIG. 3 illustrates a decoding terminal 350 for decoding of HDR data. The decoding terminal 350 may include a base layer decoder 355, an inter-layer predictor 360, an enhancement layer decoder 365, an inverse non-linear quantizer 370, an enhancement layer post-processor 375, and an adder 380.

The base layer decoder 355 may decode coded base layer video to obtain a decoded video signal therefrom. The base layer decoder 355 may invert coding operations applied by the base layer encoder 315 of the encoding terminal 310. The base layer decoder 355 may output decoded LDR video therefrom.

An inter-layer predictor 360 may generate predicted video data for developing prediction references for the HDR source video. That is, the inter-layer predictor 360 may generate an HDR representation of decoded LDR video that is available from the base layer decoder 355 and output the HDR representation to the adder 380. The inter-layer predictor 360 may generate an up-converted representation of the decoded LDR video at the bit depth of the HDR data signal.

The enhancement layer decoder 365 may decode coded enhancement layer video to obtain a decoded video signal therefrom. The enhancement layer decoder 365 may invert coding operations applied by the enhancement layer encoder 340 of the encoding terminal 310. The enhancement layer decoder 365 may output recovered video therefrom.

The inverse non-linear quantizer 370 may scale video output by the enhancement layer decoder 365. The inverse non-linear quantizer 370 may scale the video to return its bit depth to the level of the HDR source video. Thus, if the non-linear quantizer 335 had quantized input data from a 10-bit bit depth to an 8-bit bit depth, the inverse non-linear quantizer 370 may scale the video back to the 10-bit bit depth. It is not required, however, that the bit depth of the output HDR video match the bit depth of the HDR source video. Instead, the inverse non-linear quantizer 370 may scale the video to the bit depth of a display with which the decoding terminal 350 is associated. For example, if the decoding terminal were associated with a display device that output HDR video having a 10-bit bit depth, the inverse non-linear quantizer 370 may scale the video to 10-bit values even if the encoding terminal operated on HDR source video at a 32-bit bit depth. The inverse non-linear quantizer 370 may apply different quantization levels to different portions of the video sequence, which may vary over different sequences, scenes, frames, or blocks within frames, as identified in metadata present in the coded video data.

The enhancement layer post-processor 375 may apply post-processing operations to improve image quality of the HDR video output from the inverse non-linear quantizer 370. Such post-processing operations may include, for example, deblocking filtering.

The adder 380 may add pixel residuals output from the enhancement layer post-processor 375 to predicted pixel content provided by the inter-layer predictor 360. The adder 380 may output reconstructed frame data from the decoding terminal 350.

FIG. 4 illustrates an encoding terminal 400 according to another embodiment of the present disclosure. The encoding terminal 400 may code two instances of source video—a high dynamic range instance and a lower dynamic range instance. The LDR instance may provide a representation of a source video at a lower dynamic range than the HDR instance. Typically, the LDR instance represents video at a smaller bit depth, with color component data represented with 8- or 10-bit value, than the HDR instance, which may represent image data at higher bit depths (say, 10- or 12-bit values). In some embodiments, the LDR video may be authored for rendering on display devices that have lower dynamic range than the HDR video. Accordingly, the LDR and HDR instances each may have been tuned for different types of display equipment and, therefore, they may have image content that is tailored for differences among such equipment.

The encoding terminal 400 may include a base layer encoder 410, an inter-layer predictor 420, a subtractor 430, an enhancement layer pre-processor 440, a non-linear quantizer 450, an enhancement layer encoder 460, and a pre-filter 470.

The base layer encoder 410 may code LDR source video to achieve bitrate compression. For example, the base layer encoder 410 may perform motion compensated prediction that exploits spatial and/or temporal redundancies in the LDR source video to develop a compressed representation of the LDR source video. The base layer encoder 410 may output compressed base layer video to the channel. In an embodiment, the base layer encoder 410 may operate according to a predetermined coding protocol, such as those defined in ITU H.263, H.264, H.265 and the like.

The base layer encoder 410 also may decode the compressed LDR video (not shown) for local use in developing prediction references for coding later-received LDR source video as part of temporal prediction. The base layer encoder 410 also may decode compressed LDR video for local use in inter-layer prediction.

An inter-layer predictor 420 may generate predicted data for developing prediction references for the HDR source video. That is, the inter-layer predictor 420 may generate an HDR representation of decoded LDR video that is available from the base layer encoder 410 and output the HDR representation to the subtractor 430. The inter-layer predictor 420 may generate an up-converted representation of the decoded LDR video at the bit depth of the HDR data signal. Additionally, if the HDR source video includes color shifts or intensity mapping as compared to the LDR video to account for differences in HDR and LDR display environments, the inter-layer predictor 420 may apply effects to the decoded LDR video to conform the LDR video to the HDR video.

The pre-filter 470 may perform filtering operations on the HDR source video to reduce signal entropy for the enhancement layer. For example, the pre-filter 470 may smooth out the HDR source video. A variety of filtering operations may be used provided they preserve local averages of the HDR source video signal. A transform domain filter may be used, provided changes to the DC term are kept low. For example, a frequency domain filter that preferentially discards (or reduces) high frequency image content over low frequency content may be used.

The subtractor 430 may perform a pixel-by-pixel comparison between frames of the filtered HDR source video and the predicted video output by the inter-layer predictor 420. The subtractor 430 may output pixel residual signals representing a difference between the filtered source video and the predicted video output by the inter-layer predictor 420.

The enhancement layer pre-processor 440 may apply pre-processing operations to conform the HDR pixel residuals to later stages of encoding. Typically, the enhancement layer coder may apply spatial filtering to smooth image content prior to coding.

The non-linear quantizer 450 may quantize input video prior to coding. The non-linear quantizer 450 may quantize the video to reduce its bit depth to a level that is appropriate for coding by the enhancement layer encoder 460. In one example, the enhancement layer encoder 460 may be based on an LDR coder that codes input video data having a bit depth of 8 bits; in such an embodiment, the non-linear quantizer 450 may quantize its input data down to a bit depth of 8 bits. The non-linear quantizer 450 may apply different quantization levels to different portions of the video sequence, which may vary over different sequences, scenes, frames, or blocks within frames. Changes in quantization may be reported to a decoding terminal (not shown) as metadata in the coded video data.

The enhancement layer encoder 460 may code the quantized video to achieve bitrate compression. For example, the enhancement layer encoder 460 may perform motion compensated prediction that exploits spatial and/or temporal redundancies in the quantized video to develop a compressed representation of the quantized video. The enhancement layer encoder 460 may output a compressed enhancement layer video to the channel. In an embodiment, the enhancement layer encoder 460 may operate according to a predetermined coding protocol, such as those defined in ITU H.263, H.264, H.265 and the like.

Although FIG. 4 illustrates the base layer encoder 410 and enhancement layer encoder 460 as separate functional blocks, these units may be implemented as a common hardware-based encoder when implemented in an encoding terminal 400. As compared to a software-based encoder, hardware-based encoders typically operate with high throughput and reduced computational resources. The hardware-based encoder may be operated on a time shared basis, operating on LDR source video during some periods of operation and operating on quantized HDR video during other periods of operation.

FIG. 5 illustrates an encoding terminal 500 according to another embodiment of the present disclosure. The encoding terminal 500 may code two instances of source video—an HDR and an LDR. The LDR instance may provide a representation of a source video at a lower dynamic range than the HDR instance. Typically, the LDR instance represents video at a smaller bit depth, with color component data represented with 8- or 10-bit value, than the HDR instance, which may represent image data at higher bit depths (say, 10- or 12-bit values). In some embodiments, the LDR video may be authored for rendering on display devices that have lower dynamic range than the HDR video. Accordingly, the LDR and HDR instances each may have been tuned for different types of display equipment and, therefore, they may have image content that is tailored for differences among such equipment.

The encoding terminal 500 may include a base layer encoder 510, an inter-layer predictor 520, a subtractor 530, an enhancement layer pre-processor 540, a non-linear quantizer 550, an enhancement layer encoder 560, and a distortion modeler 570.

The base layer encoder 510 may code LDR source video to achieve bitrate compression. For example, the base layer encoder 510 may perform motion compensated prediction that exploits spatial and/or temporal redundancies in the LDR source video to develop a compressed representation of the LDR source video. The base layer encoder 510 may output compressed base layer video to the channel. In an embodiment, the base layer encoder 510 may operate according to a predetermined coding protocol, such as those defined in ITU H.263, H.264, H.265 and the like.

The base layer encoder 510 also may decode the compressed LDR video (not shown) for local use in developing prediction references for coding later-received LDR source video as part of temporal prediction. The base layer encoder 510 also may decode compressed LDR video for local use in inter-layer prediction.

An inter-layer predictor 520 may generate predicted data for developing prediction references for the HDR source video. That is, the inter-layer predictor 520 may generate an HDR representation of decoded LDR video that is available from the base layer encoder 510 and output the HDR representation to the subtractor 530. The inter-layer prediction may generate an up-converted representation of the decoded LDR video at the bit depth of the HDR data signal. Additionally, if the HDR source video includes color shifts or intensity mapping as compared to the LDR video to account for differences in HDR and LDR display environments, the inter-layer predictor 520 may apply effects to the decoded LDR video to conform the LDR video to the HDR video.

The subtractor 530 may perform a pixel-by-pixel comparison between frames of the filtered HDR source video and the predicted video output by the inter-layer predictor 520. The subtractor 530 may output pixel residual signals representing a difference between the filtered source video and the predicted video output by the inter-layer predictor 520.

The enhancement layer pre-processor 540 may apply pre-processing operations to conform the HDR pixel residuals to later stages of encoding. Typically, the enhancement layer coder may apply spatial filtering to smooth image content prior to coding.

The non-linear quantizer 550 may quantize input video prior to coding. The non-linear quantizer 550 may quantize the video to reduce its bit depth to a level that is appropriate for coding by the enhancement layer encoder 560. In one example, the enhancement layer encoder 560 may be based on an LDR coder that codes input video data having a bit depth of 8 bits; in such an embodiment, the non-linear quantizer 550 may quantize its input data down to a bit depth of 8 bits. The non-linear quantizer 550 may apply different quantization levels to different portions of the video sequence, which may vary over different sequences, scenes, frames, or blocks within frames. Changes in quantization may be reported to a decoding terminal (not shown) as metadata in the coded video data.

The enhancement layer encoder 560 may code the quantized video to achieve bitrate compression. For example, the enhancement layer encoder 560 may perform motion compensated prediction that exploits spatial and/or temporal redundancies in the quantized video to develop a compressed representation of the quantized video. The enhancement layer encoder 560 may output a compressed enhancement layer video to the channel. In an embodiment, the enhancement layer encoder 560 may operate according to a predetermined coding protocol, such as those defined in ITU H.263, H.264, H.265 and the like.

The distortion modeler 570 may alter quantization profiles that are applied by the non-linear quantizer 550 based on estimates of distortion that are likely to arise in decoded video from the quantization. The distortion modeler 570 may make its estimates based on statistics of the HDR source video, distortion estimates output by the base layer encoder and other sources.

In some embodiments, the non-linear quantizer 550 may employ dead-zone quantization or lloyd-max quantization can be employed. The non-linear quantizer 550 and an associated inverse quantizer (not shown) can dynamically respond to statistics of the HDR source video, in addition to the pixel residual signal. This can be implemented as an area adaptive quantizer, with addition side information signaled in the channel. Alternatively, the non-linear quantizer 550 may use an inter-layer prediction signal Pred(Compress (BL)) which is available on the decoder side.

In the enhancement layer coding, the distortion modeler 570 may measure distortion introduced by the encoder in terms of a final HDR reconstruction error of the form:

$$HDR-(Q-1(Compress(Q(EL)))+Pred(Compress(BL)))) \quad \text{Eq. 1}$$

Or $$EL-Q-1(Compress(Q(EL))) \quad \text{Eq. 2}$$

not just the distortion in the quantized domain $$Q(EL)-Compress(Q(EL)). \quad \text{Eq. 3}$$

where $Q(\bullet)$ represents a quantization operation, $Q-1(\bullet)$ represents an inverse quantization operation, $Pred(\bullet)$ refers to an inter-layer prediction operation, $Compress(\bullet)$ represents a single-layer compression operation, EL refers to enhancement layer content and BL refers to base layer content associated with the enhancement layer content. Because of non-linear quantization, those two will be different and the former is a measurement of overall distortion. In practice, mathematical approximation or LUT based techniques can be used to reduce computational costs.

The encoding terminal 500 of FIG. 5 also may include pre-filtering such as illustrated in FIG. 4. Indeed, embodiments permit the pre-filter 470 (FIG. 4) to be provided after the non-linear quantizer 550. In such an embodiment, distortion modeling also may account for signal degradation that may be introduced by a pre-filter.

In the case of adaptive enhancement layer coding, the quantizer 550 can be made adaptive to whether the current signal is inter-layer prediction residue or HDR source. Since two types of signals may have completely different characteristics, the system effectively may have two quantizers. For instance, the HDR source video can be simply linearly quantized to 8 bits whereas inter-layer prediction residue can be quantized with an 8-bit dead-zone quantizer. The quantizer choices will be conveyed as part of meta-data stream.

Although FIG. 5 illustrates the base layer encoder 510 and enhancement layer encoder 560 as separate functional blocks, these units may be implemented as a common hardware-based encoder when implemented in an encoding terminal 500. As compared to a software-based encoder, hardware-based encoders typically operate with high throughput and reduced computational resources. The hardware-based encoder may be operated on a time shared basis, operating on LDR source video during some periods of operation and operating on quantized HDR video during other periods of operation.

FIG. 6 illustrates a method 600 according to an embodiment of the present disclosure. According to the method 600, an LDR representation of source video may be coded in a base layer (box 610). The method may determine whether enhancement layer coding will be performed predictively (box 620). If so, then the method 600 may predict an HDR representation of the source video from the base layer data (box 630) and may generate HDR residuals from a comparison of the HDR source video and the predicted HDR representation (box 640). If not, or at the conclusion of the operations in box 640, the method 600 may quantize the HDR residual to a lower dynamic range (box 650). The method 600 then may code the LDR representation of the residuals in an enhancement layer (box 660). The method 600 may transmit coded base layer and enhancement layer data to a channel (box 670).

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A video coder, comprising:
   a base layer coder for coding a first representation of a video sequence;
   a comparator having an input for a second representation of the video sequence having a higher dynamic range than the first representation and having an input for prediction video data;
   an inter-layer predictor to generate the prediction video data from coded video data generated by the base layer coder at the higher dynamic range;
   a selector to bypass the second representation of the video sequence around the comparator;

a quantizer to quantize data selected by the selector, from the comparator or from bypassing the comparator, down to a lower dynamic range; and an enhancement layer coder to code data output from the quantizer, wherein the enhancement layer coder includes motion compensated prediction.

2. The video coder of claim 1, further comprising a converter having an input for the second representation of the video sequence to convert the second representation of the video sequence to the first representation of the video sequence.

3. The video coder of claim 1, wherein the quantizer quantizes two portions of data from a common frame of the video sequence using different quantization values.

4. The video coder of claim 1, further comprising a parameter selector that selects coding parameters of the base layer coder and enhancement layer coder jointly.

5. The video coder of claim 4, wherein the coding parameters are one of rate allocation, frame type, mode decision, and selection of prediction references.

6. The video coder of claim 4, wherein the coding parameters are one of temporal coding order of frames and group of frames (GOP) structure.

7. The video coder of claim 1, further comprising a distortion modeler to estimate distortion of the coded enhancement layer data based on distortions of the quantizer, the enhancement layer coding and the base layer coding.

8. A method, comprising:
coding a first representation of source video in a base layer,
predicting a second representation of the source video from the coded first representation, the second representation having a higher dynamic range than the first representation,
generating residuals from a comparison of a source video in the higher dynamic range and the predicted second representation,
selecting either the residuals or the second representation as enhancement layer data,
quantizing the enhancement layer data, either the residuals or the second representation, to a lower dynamic range, and
coding the quantized enhancement layer data in an enhancement layer, wherein the coding includes motion compensated prediction.

9. The method of claim 8, further comprising downconverting an input source video at the higher dynamic range to generate the first representation of the source video.

10. The method of claim 8, further comprising jointly selecting coding parameters of the base layer coding and the enhancement layer coding.

11. The method of claim 10, wherein the coding parameters are one of rate allocation, frame type, mode decision, and selection of prediction references.

12. The method of claim 10, wherein the coding parameters are one of temporal coding order of frames and group of frames (GOP) structure.

13. The method of claim 8, further comprising quantizing and enhancement layer coding a second portion of the source video without generating residuals therefor,
wherein coded enhancement layer data includes a flag to distinguish a portion in which the enhancement layer coding was applied to video data having residuals from another portion in which the enhancement layer coding was applied to video data without residuals.

14. The method of claim 13, wherein the quantization uses relatively larger step sizes for video data without residuals than for video data having residuals, as indicated by the flag.

15. The method of claim 13, wherein the enhancement layer coding disables intra-coding for portions of the video data that occur at boundaries between a region of the video data without residuals and a region of video data having residuals, as indicated by the flag.

16. The method of claim 8, wherein the quantizing applies different quantization values for different portions of a common frame of the source video.

17. The method of claim 8, wherein the quantizing derives quantization values from coding parameters of the base layer coding.

18. The method of claim 8, further comprising estimating distortion of the coded enhancement layer data based on distortions of a quantizer, the enhancement layer coding and the base layer coding.

19. A video decoder, comprising:
a base layer decoder for decoding a first coded representation of a video sequence;
an enhancement layer decoder to decode a second coded representation of the video sequence, wherein the enhancement layer decoder includes motion compensated prediction;
an inverse quantizer to scale data output from the enhancement layer decoder to a higher dynamic range to generate first reconstructed video data;
an inter-layer predictor to generate prediction video data from decoded video data generated by the base layer decoder at the higher dynamic range;
an adder to merge the first reconstructed video data with the prediction video data to generate second reconstructed video data; and
a selector to select either the first or second reconstructed video data as decoded video data at the higher dynamic range.

20. The coder of claim 1, wherein the quantizer is controlled based on whether the selector bypasses the comparator.

21. The coder of claim 1, further comprising a distortion modeler for controlling the quantizer based on an estimate of distortion.

22. The coder of claim 1, wherein the base layer coder and the enhancement layer coder are the same coder operated on a time-shared basis between base layer coding and enhancement layer coding.

* * * * *